United States Patent [19]
Butts et al.

[11] Patent Number: 5,978,460
[45] Date of Patent: Nov. 2, 1999

[54] COIN TELEPHONE DATA PORT PROTECTION

[75] Inventors: Michael Lee Butts, Noblesville; Daniel Warren Macauley, Fishers, both of Ind.

[73] Assignee: Lucent Technologies Inc., Murray Hill, N.J.

[21] Appl. No.: 08/941,555

[22] Filed: Sep. 30, 1997

[51] Int. Cl.⁶ .................................................. H04M 17/00
[52] U.S. Cl. .......................................... 379/145; 379/146
[58] Field of Search .................................... 379/143, 145, 379/146, 147, 148, 149, 150, 151, 189

[56] References Cited

U.S. PATENT DOCUMENTS

| | | | |
|---|---|---|---|
| 3,627,950 | 12/1971 | Sand | 379/143 |
| 4,039,768 | 8/1977 | O'Mailey | 379/147 |
| 4,076,962 | 2/1978 | Streisand | 379/146 |
| 4,124,774 | 11/1978 | Zarouni | 379/146 |
| 4,674,114 | 6/1987 | Crouch et al. | 379/145 |
| 4,759,054 | 7/1988 | Mellon | 379/150 |
| 4,794,642 | 12/1988 | Arbabzadah et al. | 379/145 |
| 4,862,494 | 8/1989 | Matheny | 379/146 |
| 4,896,348 | 1/1990 | Grantland et al. | 379/146 |
| 4,926,468 | 5/1990 | Smith et al. | 379/145 |
| 4,989,239 | 1/1991 | McGarry | 379/146 |
| 5,007,077 | 4/1991 | Fields et al. | 379/146 |
| 5,105,460 | 4/1992 | Williams | 379/155 |
| 5,150,403 | 9/1992 | Jordan | 379/145 |
| 5,168,518 | 12/1992 | Criscenzo et al. | 379/145 |
| 5,757,896 | 5/1998 | Akhteruzzaman et al. | 379/145 |
| 5,907,606 | 5/1999 | Ingalsbe et al. | 379/143 |

*Primary Examiner*—Huyen Le
*Assistant Examiner*—Rexford N. Barnie

[57] ABSTRACT

A package advantageously to be mounted within the housing of a coin telephone permits the telephone set to exhibit a jack to which a personal computer may be connected without danger of the jack being used for fraudulent purposes by normally maintaining the jack isolated from the central office conductors. A local battery powers a microprocessor which senses when a modem is connected to the jack. The microprocessor controls the connection to the central office conductors which then supply power for the further continuous monitoring of the conductors to determine whether the connection is being used legitimately or whether tones are applied at the jack to simulate the deposit of coins. In addition, the jack is disconnected from the central office conductors during the time that the initial rate test is being performed by the central office.

6 Claims, 4 Drawing Sheets

COIN TELEPHONE DATA PORT PROTECTION

FIELD OF THE INVENTION

This invention relates to coin telephone instruments and, more particularly, to the provision of a data port to permit customers to use the modem of their personal computer with a coin telephone set.

BACKGROUND OF THE INVENTION

Heretofore telephone companies have been reluctant to equip coin telephone sets with a data port jack that would permit customers to attach their personal computers to the telephone set because such a jack can allow certain types of fraudulent calls to be made. For example, during the initial part of a telephone coin call, the central office performs a test to see if the correct amount of money has been deposited to complete a call. This test is called the initial rate test. Initial rate is the cost of a local call. When this amount has been deposited in the phone, a connection is made between the tip and earth ground is made. The central office tests for this condition, typically by connecting battery between tip and earth ground. However, the initial rate condition can be simulated by connecting almost any part of the telephone circuitry to ground. This simulation is called "pin fraud" because one way of doing this is to force a pin into the handset cord to short the conductors to the grounded metal sheath. Another fraud problem can arise if the coin telephone has a jack to permit a customer to attach his computer modem so as to be able to send fax messages or other data over the phone line. Unfortunately, a jack that extends the tip and ring conductors of the phone to the customer's computer would also give an unscrupulous user the ability to employ the computer to simulate the tones that the coin telephone transmits when coins are deposited, and thus permit fraudulent operation of the telephone set. This type of fraud is called "red box" fraud. Notwithstanding these difficulties, it would be extremely desirable to permit customers to use their personal computers with coin telephones without subjecting the coin phone to the possibility of fraudulent usage.

SUMMARY OF THE INVENTION

The illustrative embodiment of the invention includes circuitry to be installed, advantageously as package to be mounted within the housing of a coin telephone set so as to enable the telephone set to permit a personal computer to be connected to a jack on the telephone set without danger of the jack being used for fraudulent purposes. The circuitry normally maintains the jack isolated from the central office conductors. A local battery powers a microprocessor which senses when a modem is connected to the jack to cut through a connection so that further power for the continuous monitoring of the conductors from the jack to the central office can be derived from the central office instead of the local battery. The microprocessor monitoring determines whether the connection is being used legitimately or whether tones are applied at the jack to simulate the deposit of coins. In addition, the jack is disconnected from the central office conductors during the time that the initial rate test is being performed by the central office.

BRIEF DESCRIPTION OF THE DRAWING

The foregoing and other features may become more apparent by referring now to the drawing in which.

GENERAL DESCRIPTION

Figure 1:
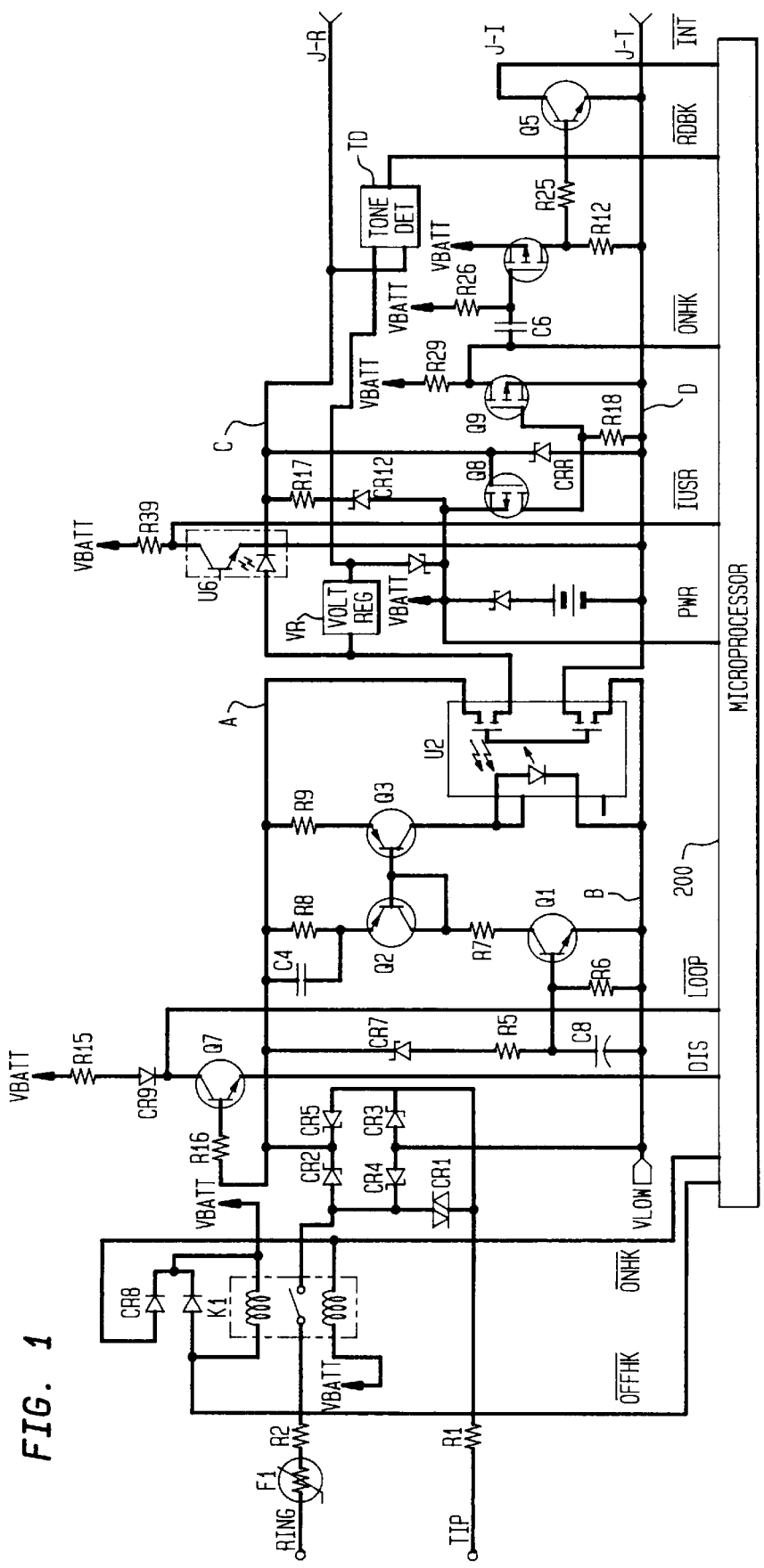
FIG. 1 is a schematic diagram of an illustrative embodiment of the invention for mounting within a coin telephone set to permit the connection of a user's computer modem to a jack of the coin telephone set.

In FIG. 1, the tip and ring conductors from the coin telephone set to the central office are shown at the left, while the tip and ring conductors for connection of a user's modem to the coin telephone set appear at jack J–1 at the right. With the circuit at rest relay K1, at the left, opens ring lead ring lead continuity between the central office and jack J–1. Without continuity of the ring lead, a fraudulent user cannot ground the ring terminal J-R of jack J–1 and simulate an initial coin deposit signal to the central office. With the circuit at rest, negligible current is drawn from battery B1 and transistor Q8, at the right, is off since its gate and drain electrodes are both at the potential of battery B1. When the user's modem goes off-hook, a connection is completed in the modem between terminals J-R and J-T. This connection places the gate of transistor Q8 at a lower potential than its drain causing transistor Q8 to turn on. Transistor Q8, in turning on, turns on transistor Q9 which is of opposite conductivity type to transistor Q8. Transistor Q9, in turning on, draws current through resistor R29, lowering the potential at the junction of resistor R29 and capacitor C6. Capacitor C6 passes a negative-going pulse to the gate of transistor Q4, momentarily turning on this transistor which, in turn, turns on transistor Q5. The lowered potential at the junction of resistor R29 and capacitor C6 is applied to lead USRDY at the input of microprocessor 200, however this lowered potential is not effective to activate the microprocessor until transistor Q5 is turned on by transistor Q4 activating microprocessor interrupt lead INT. Microprocessor 200, having received an interrupt, is awakened from its sleep state and can respond to the "user ready" signal applied by transistor Q9 to lead USRDY. Microprocessor now energizes its output lead OFFHK causing relay K1 to close its contacts in series with the ring lead to the central office.

The remote central office normally maintains negative battery on the ring lead and ground on the tip lead. With the contacts of relay K1 closed, a path is completed which allows remote central office battery to power up the current-mirror power supply comprising zener diode CR7, resistors R5, R6 and transistors Q1, Q2 and Q3. This path may be traced from ground on the tip lead supplied by the central office, through diodeCR5, lead A, resistor R8, the emitter collector path of diode connected transistor Q2, resistor R7, the emitter collector path of transistor Q1, lead B, and diode CR4 to negative battery on the ring lead to the remote central office. Transistors Q1 and Q2 turn on, turning on transistor Q3 which supplies a constant current to opto-isolator U2, turning it on. Opto-isolator U2 turned on, completes a path from lead A to lead C and from lead B to lead D. Accordingly, a path may be traced from the remote central office tip lead, diode CR5, lead A, opto-isolator U2, lead C to jack J–1 and through the user's modem to lead D, opto-isolator U2, lead B and diode CR4 and the contacts of relay K1 to the ring lead to the remote central office. At the same time that opto-isolator U2 completes the path between the central office and jack J–1, central office battery appears on lead C, thereby energizing voltage regulator VR and enabling it to take over the function of supplying power to the remaining circuitry, and removing any further power drain on battery B1.

When opto-isolator U2 completes the path between the central office conductors and jack J–1, opto-isolator U6 applies a negative going signal on lead IUSR to microprocessor 200 indicating to the microprocessor that the user is drawing current from the central office. The user may now operate his modem on the connection to the central office in any desired manner. However, should tones be applied at jack J–1 which simulate the deposit of coins during an interval when the central office would normally expect to receive such tones so as to permit a toll call to proceed, tone detector TD will detect one or more of the coin tone frequencies employed, and energize lead RDBX to microprocessor 200. In response, microprocessor 200 times the duration of the signal on lead RDBX and if the signal persists long enough to indicate that a coin tone is being applied at jack J–1, microprocessor energizes its output lead ONHK to cause relay K1 to open-circuit the ring lead to the remote central office thereby interrupting the fraudulent call attempt.

More particularly, opening of relay contacts K1 opens the loop which is interpreted by the central office as a disconnect or hang-up. Opening of relay contacts K1 also removes central office battery current from opto-isolator U2 which opens the connection between leads A and C and between leads B and D. Jack J–1 is thereby isolated from the central office conductors. The opening of the loop to the central office turns off transistor Q7 causing the potential at it emitter to rise toward that of battery B1 which potential is applied to microprocessor 200 over lead LOOP. In response, microprocessor 200 removes the return path to the emitter of transistor Q7 so that transistor cannot respond to a re-closure of the loop for a predetermined interval of time, and an internal "fraud attempt" flag is set to indicate that a fraudulent call attempt has been made. While the fraud attempt flag remains set, a connection between terminal J-R and J-T of jack J–1 by the user's modem will not result in the re-establishment of a complete path from to the central office conductors.

Figure 2:
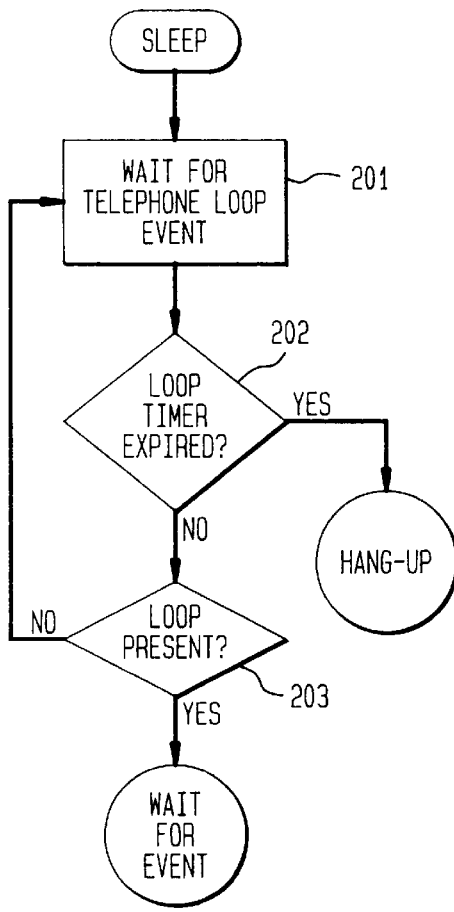
FIGS. 2 through 5 are flow charts depicting the processes performed by the microprocessor which controls the operation of the circuitry of FIG. 1.
Figure 3:
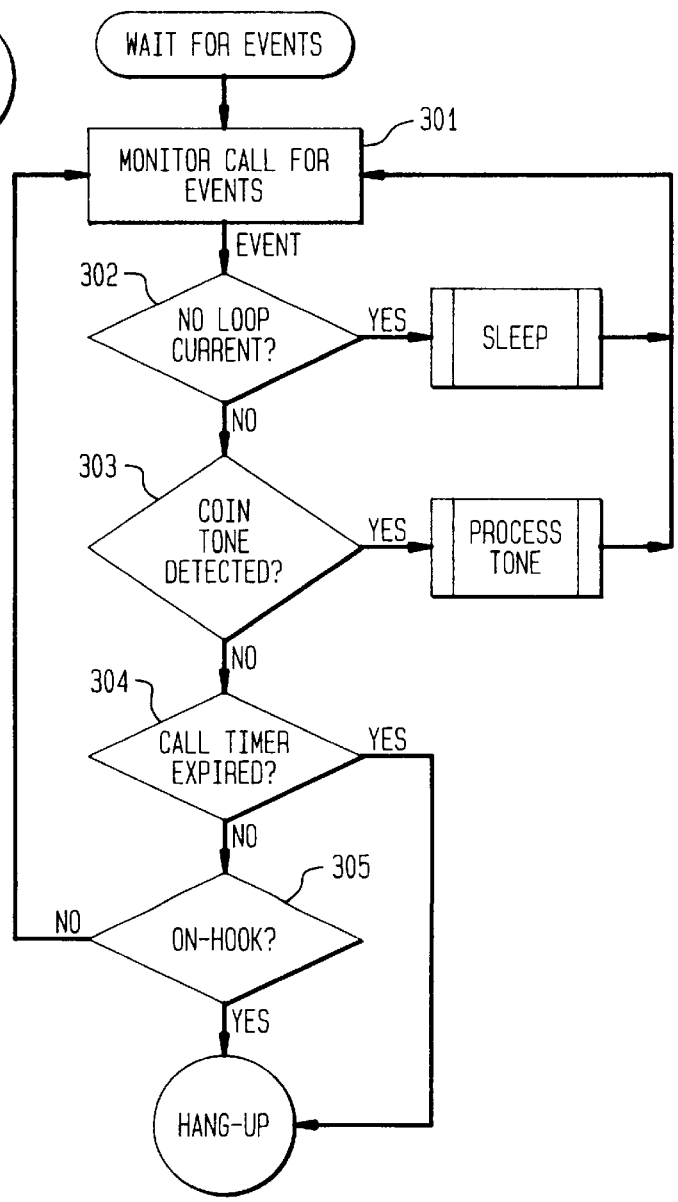

The foregoing processes are summarized in the flow charts of FIGS. 2 through 5. In FIG. 2 it is assumed at 201 that microprocessor 200 is in its inactive or "sleep" state and awaiting the appearance of an interrupt signal on lead INT. If an interrupt signal appears, microprocessor awaits the appearance of a loop closure signal on lead LOOP which must occur within a predetermined time dictated by an internal timer. If no signal appears on lead LOOP within the predetermined time microprocessor energizes lead ONHK to disconnect jack J–1 from the central office conductors, as indicated at 202. On the other hand, if the signal appears on lead LOOP, as indicated at 203, control passes to the "wait for event" condition, FIG. 3. Microprocessor monitors leads INT, RDBX, USRDY and LOOP, as indicated at 301. If, at step 302, lead USRDY is not energized, as described above, the microprocessor remains in its "sleep" state. If loop current toward jack J–1 has been detected at step 302 but lead RDBX has been energized indicating the detection of a simulated coin deposit tone, microprocessor at step 303 responds to the detection of the tone to determines if the tone persists long enough to indicate a fraudulent call attempt. This is accomplished in FIG. 4 which times the energization of lead RDBX to see if it persists for the interval corresponding to that of a coin deposit tone. If no coin deposit tone is detected at step 303, microprocessor awaits the expiration of an optional internal timer which may be set to interrupt a call whose length exceeds a predetermined threshold time, such as 30 minutes to prevent a customer from monopolizing the use of the coin telephone for an inordinate amount of time. If the optional preset time has not yet expired, microprocessor at step 305 continues to monitor leads IUSR and LOOP to detect hangup by the modem at jack J–1 or disconnect by the central office.

Figure 4:
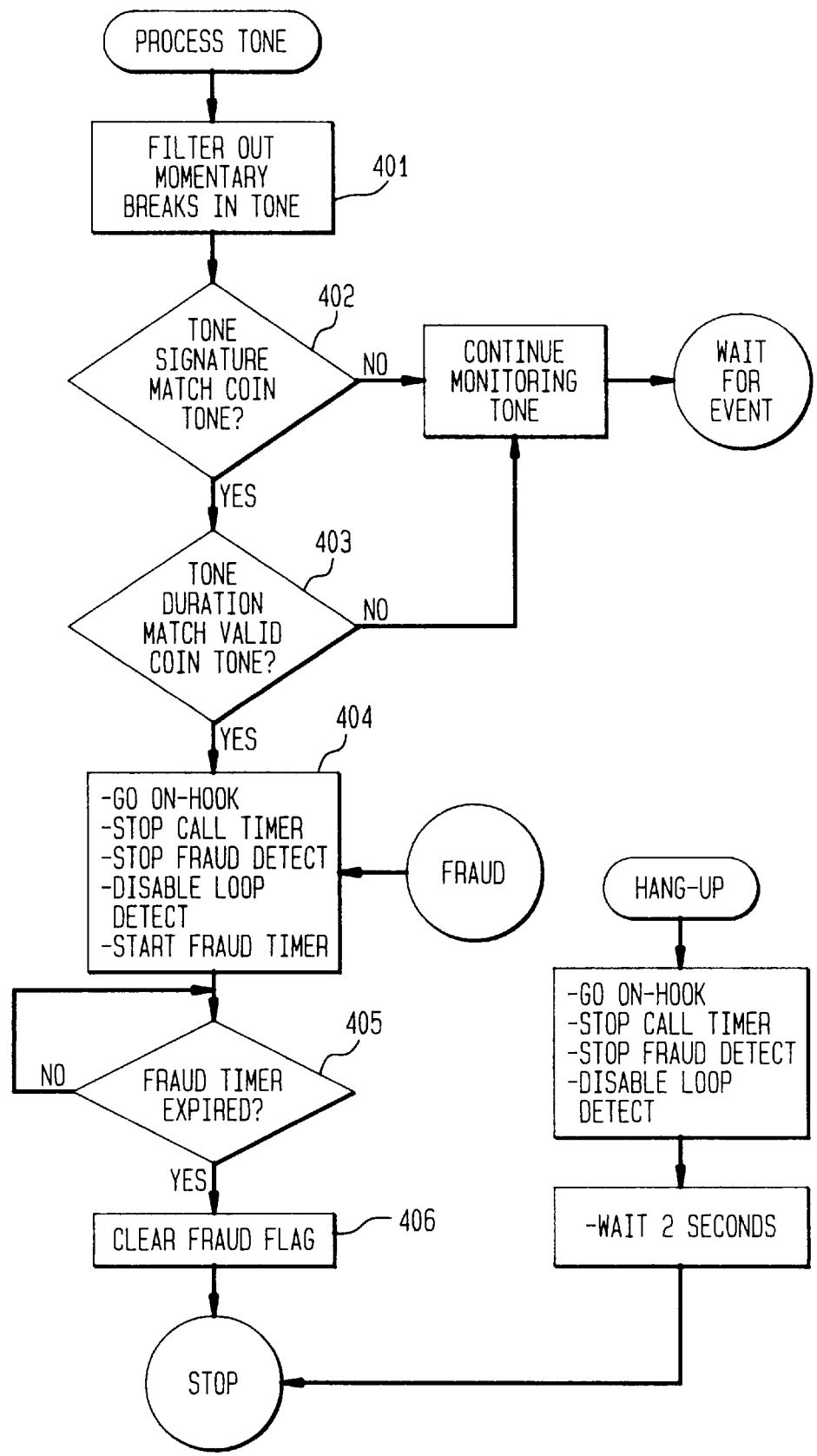

In FIG. 4 microprocessor responds to the appearance of a signal on lead RDBX to set its internal timer for an interval corresponding to the duration of a simulated coin deposit tone signal, neglecting momentary breaks in the tone persisting for less than about 1 millisecond, as indicated at 401. If the tone does not persist for the requisite interval as determined in step 402, monitoring of lead RDBX continues. If the tone lasts for an interval corresponding to that of a coin deposit signal, as determined in step 403, microprocessor enters step 404. In step 404 microprocessor 200 responds to the detection of a fraud condition. Microprocessor energizes its lead ONHK to open relay contacts K1 to remove the connection toward the central office. Microprocessor 200 sets its internal fraud attempt flag and disable interval timer, and removes the path to the emitter of transistor Q7 until the disable interval timer has timed out. While the user may continue to attempt to re-initiating a service request during the disable time interval, transistor Q7 is prevented from confirming any loop closure toward the central office and relay K1 if operated will be released. Upon the expiration of the disable interval time, at step 405, the fraud flag is rest at step 406.

Figure 5:
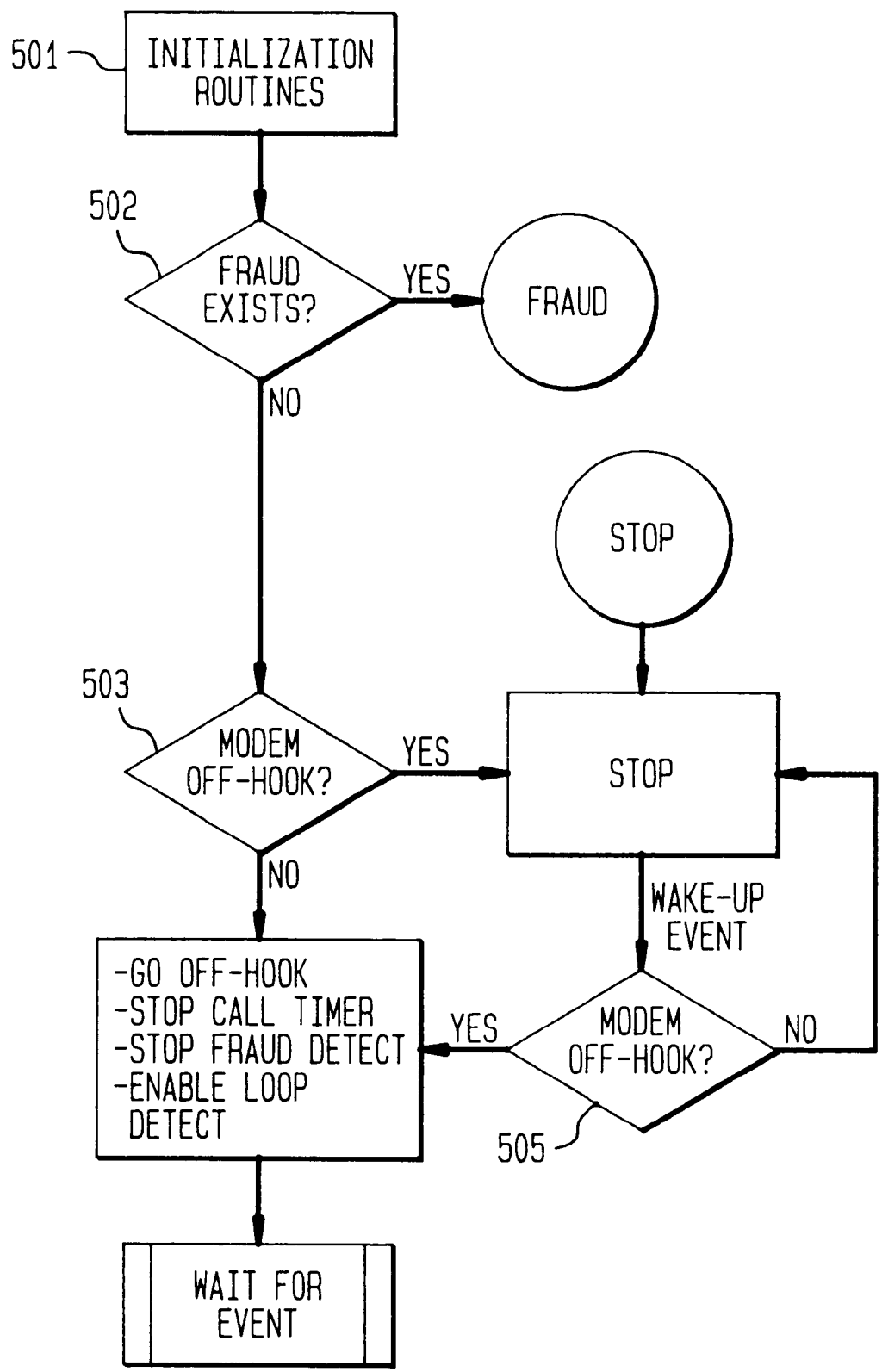

FIG. 5 indicates a series of steps undertaken should a fraud attempt be made in an unusual manner. At step 501, microprocessor is initialized. Ordinarily, this step would only be performed when the coin telephone set circuitry of FIG. 1 was initially installed. However, in the event that a fraudulent user drills a hole in the coin telephone set and inserts a wire probe in an attempt to circumvent the operation of the apparatus, some preliminary routines are executed. Following the initialization, microprocessor determines in step 502 whether the fraud flag had been set. If the fraud flag is set, control is returned to step 404, and the operations previously described are performed. If the fraud flag had not been set, microprocessor at step 503 monitors leads INT and USRDY to detect user off-hook at jack J–1. In the event lead USRDY is energized by lead INT had not previously been energized, microprocessor at step 504 is stopped until lead INT is momentarily energized. When lead INT is energized, microprocessor determines at step 505 if lead USRDY is energized and, if so the sequence of operations at step 506 are performed. At step 506, microprocessor activates lead OFFHK, starts its optional call duration timer, monitors lead RDBX and completes a path to the emitter of transistor Q7 to permit loop current to be detected.

What has been described is deemed to be illustrative of the principles of the invention. Numerous modifications may be made by those skilled in the art without, however, departing from the spirit and scope of the invention.

What is claimed is:

1. A circuit package for installation in a coin telephone set having conductors extending to a remote central office and a jack for permitting a modem to complete a direct connection to said central office, comprising:
   a. a switch adapted to isolate said jack from said central office conductors;
   b. a local battery;
   c. a circuit powered by said local battery for sensing when said modem is connected to said jack;
   d. an arrangement responsive to said battery powered circuit for operating said switch to connect said jack to said central office conductors;
   e. means operative when said switch has been operated to connect said jack to said central office for monitoring said conductors to detect the appearance of fraudulent usage conditions thereon.

2. A circuit package for installation in a coin telephone set having conductors extending to a remote central office and a jack for permitting a modem to complete a central office connection, comprising:
   a. means for sensing the making of a connection to said jack;
   b. means responsive to said sensing means for extending a direct connection from said jack to said conductors;
   c. means for detecting the closure of a loop circuit to said central office over said conductors; and
   d. means responsive to the detection of a fraud condition at said jack for disabling said extending means for a predetermined time interval.

3. A circuit package according to claim 2 wherein said sensing means and said extending means includes a microprocessor powered by a local battery independently of central office battery.

4. A circuit package according to claim 2 wherein said means for detecting the closure of a loop circuit to said central office includes means responsive to the appearance of central office battery on said conductors.

5. A microprocessor controlled anti-fraud circuit package for insertion in a coin telephone set having a jack for permitting the connection of a user device, comprising
   a. a local battery (B1) for powering said microprocessor (200) to monitor connections made to said jack prior to completing a direct connection from said jack to central office conductors;
   b. a switch (K1) controlled by said microprocessor for temporarily connecting said central office conductors to said jack in response to said completing of said connection to said jack;
   c. a detector (TD) for detecting the appearance of a simulated coin deposit tone on said loop toward said jack;
   d. a voltage regulator (VR) for powering said microprocessor and said tone detector from said central office conductors;
   e. a transistor circuit (Q7) for responding to the completion of a loop toward said central office for signaling said microprocessor to maintain said switch operated, said microprocessor disabling said transistor in response to said detector detecting said simulated coin deposit tone.

6. A microprocessor controlled anti-fraud circuit package for insertion in a coin telephone set having a jack for permitting the direct connection of a user device to make a central office telephone call, said microprocessor controlling said circuit to:
   a. monitor for a user generated interrupt while said processor is powered by local battery;
   b. respond to said interrupt to connect said microprocessor to central office battery;
   c. respond to the appearance of central office battery to monitor:
      i. loop continuity over conductors leading toward said central office;
      ii. loop continuity toward said jack;
      iii. for appearance of simulated coin deposit tone;
   d. respond to the removal of central office battery to:
      i. isolate said jack from said central office conductors; and
   e. respond to the appearance of simulated cone deposit tone to prohibit connection to said central office for a predetermined time interval.

* * * * *